Patented Sept. 26, 1939

2,173,876

UNITED STATES PATENT OFFICE 2,173,876

PROCESS FOR THE RECOVERY OF ZINC VALUES FROM GALVANIZERS' SKIMMINGS

Robert J. Campbell, South Ardmore, Pa., assignor to E. I. du Pont de Nemours & Company, Wilmington, Del., a corporation of Delaware No Drawing. Application December 10, 1937, Serial No. 179,100

2 Claims. (Cl. 23—125)

This invention relates to the recovery of zinc values from galvanizers' skimmings and is more particularly directed to processes by means of which zinc compounds of low chloride content may be obtained.

Galvanizers' skimmings are a galvanizer's waste of complex composition. This waste material ordinarily contains ammonium chloride, zinc chloride, basic zinc chloride, and possibly other such compounds of zinc, ammonia, and chlorine together with some metallic zinc. Galvanizers' skimmings are variously termed "sal ammoniac skimmings", "sal skimmings", or simply galvanizers' waste in the trade.

It has previously been proposed to recover values from galvanizers' skimmings as for instance in Meister Patent 714,502 wherein the skimmings are ground with lime, in the Howard et al. Patent 715,804 wherein after a number of treatments the zinc values are recovered by the use of lime, in the Terne Patent 869,750 wherein galvanizers' skimmings are extracted with water and zinc and chlorine values recovered by the use of ammonia.

The processes heretofore proposed are subject to numerous disadvantages, such for instance, as their complexity and the relatively impure character of the products obtained.

Now I have found that zinc compounds of low chloride content may readily be produced from galvanizers' skimmings by a sequence of operations involving making a slurry of galvanizers' waste in water, treating the resultant slurry with lime to convert zinc compounds present to a basic zinc chloride, separating the basic zinc chloride from the solution, suspending the basic zinc chloride in water, further treating the basic zinc chloride with lime to produce zinc hydroxide, and finally separating the chloride-free zinc hydroxide from the solution.

The zinc hydroxide thus produced may be used as such tho preferably other compounds of low chloride content will be made therefrom, as for instance, by dissolving the zinc hydroxide in sulfuric acid to make zinc sulfate.

The processes of my invention provide a technically and economically sound method for the recovery of zinc values from galvanizers' skimmings. The processes of my invention are singularly free from operating difficulty and the products produced are of excellent character and purity. In commercial operation a zinc sulfate product with a chloride content below six-tenths pound per hundred pounds of zinc present has readily been obtained from galvanizers' skimmings in which the chlorine content was as high as sixty to seventy pounds per hundred pounds of zinc.

A process of my invention as it is carried out commercially starts off by feeding water and galvanizers' skimmings to ball mill continuously in such proportions that a slurry having a gravity of about 15° Bé. is obtained. The temperature of this slurry in the ball mill is maintained at about 100 to 150° F. by blowing it with low pressure steam.

From the ball mill the slurry obtained is led to a classifier where unsuspended coarse zinc and other insoluble unsuspended materials are separated from the slurry by wet elutriation.

After unsuspended metallic zinc and other unsuspended material has been removed, the slurry containing suspended insoluble basic zinc chloride, and zinc chloride and ammonium chloride in solution is then pumped to liming tanks.

In the liming tanks a lime slurry containing from twelve to fifteen per cent $Ca(OH)_2$ is added until a maximum amount of the soluble zinc compound present is precipitated as basic zinc chloride. At this point the slurry is slightly on the acid side of the phenolphthalein end point.

After the liming operation, water is added to the slurry, if necessary, so that when a sample of the slurry is filtered the filtrate has a gravity not exceeding 5° Bé. at 125° F. The temperature of the slurry is adjusted so that it does not exceed 125° F.

The slurry from the first liming operation having been brought to the proper concentration and temperature is then filtered, the filter cake being washed to free it as much as practicable from soluble chlorides.

The washed filtered cake is repulped to make a slurry of about 30 to 40° Bé. at 130° F. and the slurry is run into a second liming tank to which a limed slurry containing about fifteen per cent $Ca(OH)_2$ has previously been added in an amount approximately sufficient to convert all of the chloride present to soluble calcium chloride. The mixture is then agitated and heated to boiling.

A control titration is made on a sample of the boiling slurry and lime is added until the final filter cake will contain two to three pounds of excess lime per hundred pounds of zinc. After this adjustment the slurry is boiled for one-half hour and then preparatory to filtration the batch is cooled to about 150° F. and the gravity is adjusted to 30 to 35° Bé.

The slurry is then filtered and the filter cake washed with water. The filter cake is repulped and refiltered at a temperature between 150 and 180° F. and at a gravity between about 30 and 35° Bé.

The washed filter cake finally obtained consists essentially of zinc hydroxide. This zinc hydroxide is very low in chloride content.

The zinc hydroxide may be used to produce any desired zinc compound, but in my commercial process it is the practice to dissolve the filter cake in sulfuric acid or in an acidic zinc sulfate liquor to obtain a zinc sulfate solution. The solution is then concentrated and zinc sulfate crystallized out, or flaked, or otherwise recovered in salable form.

The first step of my process involving the separation of insoluble material is of considerable importance in the process as a whole. It might appear that there would be no disadvantage in permitting insoluble metallic zinc to be carried thru the process since it would seem that upon dissolving the last filter cake in sulfuric acid zinc sulfate would ultimately thus be produced. When fine metallic zinc is not removed, a product is obtained which has a higher chloride content than a product produced by a process wherein the fine metallic zinc is removed by classification.

I do not understand the reason underlying the effect but I have found that if metallic zinc is separated prior to the liming operations, a product exceedingly low in chloride can be obtained.

The temperature at which the separation of unsuspendable matter is effected may be widely varied, the use of elevated temperatures simply expediting solution.

It will be understood that the use of a ball mill provides a simple and effective means for causing solution and suspension of the material which is to be further treated, and other suitable mechanical mullers, grinders, or agitators may be used if desired.

The separation of unsuspended material is most efficaciously accomplished by the use of a wet elutriation method in a continuous manner as described. Separation may of course be effected by a simple decantation or by other such means.

The first liming operation should be conducted in such a way that the zinc values are substantially all precipitated as a basic zinc chloride. The basic zinc chloride is of indeterminate chemical structure and it may be a mixture of zinc hydrate and a small amount of zinc chloride. The use of larger amounts of lime causes decomposition of basic zinc chloride including that originally present and washing of ammonium chloride from the filter cake is made difficult. It will be understood that while it is convenient to carry the liming operation to a point slightly on the acid side of the phenolphthalein end point, a considerable variation in the extent of liming may be made.

It is important that the slurry from the first liming operation have a water content such that the filtrate gravity will not substantially exceed 5° Bé. at 125° F. and the temperature of the slurry when it is filtered should not substantially exceed 125° F. If the temperature or filtrate gravity are substantially higher than indicated, some of the basic zinc chloride will pass thru the filter and will be lost. Upon subsequent cooling and solution of the filtrate this basic zinc chloride will cause operating difficulties such as the clogging of pipelines. This consideration is of the greatest importance in commercial operations and by observance of the indicated limitation the process may continuously and effectively be operated.

The conditions under which the second liming operations are conducted are not particularly critical but are determined by the usual conditions incident to this type of chemical operation. The slurry is repulped at about 30 to 40° Bé. at 120° F.

The concentration of the lime slurry used is not particularly critical, the use of about twelve to fifteen per cent $Ca(OH)_2$ simply being most convenient in the process as it is commercially practiced. It is important to use an excess of lime as indicated since otherwise the removal of chlorides will not be so complete. Of course, if no particular importance is attached to having the chloride content exceedingly low, the amount of lime used could be accordingly diminished, but this practice will not be found commercially desirable in most instances.

The temperature and concentration of the slurry to be filtered after the second liming operation is much less important than in the filtration after the first liming operation. The temperature should be elevated and as indicated may conveniently be between about 150° and 180° F. The gravity of the slurry should be around 30 to 35° Bé. since at this concentration it is most conveniently handled. If a gravity much above 35° Bé. is used, there is a tendency for chlorine occlusion and consequent product contamination.

Ammonium compounds are mostly removed on the first filtration, the compounds going with the filtrate. Any ammonium compounds remaining are subsequently removed when the slurry is boiled with an excess of lime, ammonia being removed by volatilization. The removal of ammonia in this manner makes the resulting product low in ammonium compounds as well as low in chlorides.

While I have shown certain illustrative processes in the foregoing, it will be understood that those skilled in the art may readily devise numerous processes of similar type without departing from the spirit of my invention.

I claim:

1. In a process for the recovery of zinc values from galvanizers' skimmings which is comprised of ammonium chloride, zinc chloride, basic zinc chloride, and metallic zinc, the steps comprising ball milling the galvanizers' skimmings with water to make a slurry containing soluble and suspendable matter, treating with lime to precipitate basic zinc chloride, filtering at a temperature not substantially higher than about 125° F. and with a concentration such that the filtrate has a gravity not substantially greater than 5° Bé., reslurrying the filter cake obtained, treating the slurry with an excess of lime to convert zinc to zinc hydroxide, and separating the zinc hydroxide, and dissolving the zinc hydroxide in sulfuric acid to produce zinc sulfate.

2. In a process for the recovery of zinc values from galvanizers' skimmings which is comprised of ammonium chloride, zinc chloride, basic zinc chloride, and metallic zinc to make a product low in ammonium compounds and low in chlorides, the steps comprising ball milling the galvanizers' skimmings with water to make a slurry containing soluble and suspendable matter, treating with lime to precipitate basic zinc chloride, filtering at a temperature not substantially higher than about 125° F. and with a concentration such that the filtrate has a gravity not substantially greater than 5° Bé., reslurrying the filter cake obtained, treating the slurry with an excess of lime to convert zinc to zinc hydroxide, boiling the slurry to drive off ammonia, separating the zinc hydroxide, and dissolving the zinc hydroxide in sulfuric acid to produce zinc sulfate.

ROBERT J. CAMPBELL.